(12) United States Patent
Kondo

(10) Patent No.: US 9,073,620 B2
(45) Date of Patent: Jul. 7, 2015

(54) FASTENING DEVICE FOR WINDOW

(71) Applicant: Honda Patents & Technologies North America, LLC, Torrance, CA (US)

(72) Inventor: Junichi Kondo, Greensboro, NC (US)

(73) Assignee: Honda Patents & Technologies North America, LLC, Torrance, CA (US)

( * ) Notice: Subject to any disclaimer, the term of this patent is extended or adjusted under 35 U.S.C. 154(b) by 292 days.

(21) Appl. No.: 13/912,579

(22) Filed: Jun. 7, 2013

(65) Prior Publication Data

US 2014/0363254 A1    Dec. 11, 2014

(51) Int. Cl.
| | |
|---|---|
| *B64C 1/06* | (2006.01) |
| *B64C 1/14* | (2006.01) |
| *B63B 19/02* | (2006.01) |
| *B64G 1/22* | (2006.01) |

(52) U.S. Cl.
CPC .............. *B64C 1/1492* (2013.01); *B63B 19/02* (2013.01); *B64G 1/22* (2013.01)

(58) Field of Classification Search
USPC ......... 244/131, 129.3, 192.1, 132; 29/525.13, 29/525.03, 525.04
See application file for complete search history.

(56) References Cited

U.S. PATENT DOCUMENTS

| | | | | |
|---|---|---|---|---|
| 2,447,059 | A | | 8/1948 | Eaton, Jr. et al. |
| 2,590,761 | A | | 3/1952 | Edgar |
| 2,784,926 | A | * | 3/1957 | Bonza et al. ............... 244/129.3 |
| 3,679,527 | A | | 7/1972 | Crick |
| 4,004,388 | A | | 1/1977 | Stefanik |
| 4,046,933 | A | * | 9/1977 | Stefanik ......................... 428/81 |
| 4,081,581 | A | * | 3/1978 | Littell, Jr. ...................... 428/138 |
| 4,204,374 | A | * | 5/1980 | Olson .............................. 52/208 |
| 4,324,373 | A | | 4/1982 | Zibritosky |
| 4,933,227 | A | | 6/1990 | Stewart |
| 4,964,594 | A | * | 10/1990 | Webb ............................. 244/131 |
| 5,785,431 | A | | 7/1998 | Nilsson et al. |
| 5,876,024 | A | | 3/1999 | Hain |
| 7,375,277 | B1 | | 5/2008 | Skinner et al. |
| 8,297,556 | B2 | * | 10/2012 | Krahn ........................ 244/129.3 |
| 8,740,152 | B1 | * | 6/2014 | Lyon et al. .................... 244/132 |
| 2006/0284016 | A1 | | 12/2006 | Balsillie et al. |
| 2012/0228428 | A1 | * | 9/2012 | Deganis et al. ............ 244/129.3 |
| 2013/0026296 | A1 | | 1/2013 | Yokoi |

FOREIGN PATENT DOCUMENTS

GB            842657            7/1960

OTHER PUBLICATIONS

International Search Report and Written Opinion of PCT/US2014/039879 dated Oct. 9, 2014, 7 pages.

* cited by examiner

*Primary Examiner* — Christopher P Ellis
(74) *Attorney, Agent, or Firm* — Rankin, Hill & Clark LLP

(57) ABSTRACT

A fastening assembly for a window of a pressurized fuselage of an aircraft includes a fastener received through a mounting hole defined in the window, an edge attachment member fixing the window to the fuselage, and a bushing assembly embedded in the mounting hole. The bushing assembly includes an inner sleeve bushing radially interposed between the fastener and the window and an outer sleeve bushing radially interposed between the inner sleeve bushing and the window. The inner sleeve bushing is formed from relatively less rigid metal compared with metal of the fastener and the outer sleeve bushing is formed from relatively rigid metal compared with material of the window and the metal of the inner sleeve bushing.

15 Claims, 7 Drawing Sheets

MAXIMUM PRINCIPAL STRESS

| COMBINATION | OUTER BUSHING | INNER BUSHING | MAX. PRINCIPAL STRESS |
|---|---|---|---|
| A | STEEL (E=29.0 X $10^3$ KSI) | STEEL (E=29.0 X $10^3$ KSI) | 9.53 KSI |
| B | STEEL (E=29.0 X $10^3$ KSI) | ALUMINUM (E=10.1 X $10^3$ KSI) | 9.56 KSI |
| C | ALUMINUM (E=10.1 X $10^3$ KSI) | STEEL (E=29.0 X $10^3$ KSI) | 10.18 KSI |
| D | ALUMINUM (E=10.1 X $10^3$ KSI) | ALUMINUM (E=10.1 X $10^3$ KSI) | 10.64 KSI |

FIG. 4

FASTENING DEVICE FOR WINDOW

BACKGROUND

The present disclosure generally relates to a fastening assembly for a window, and particularly relates to a window fastening assembly for a window of a pressurized chamber or compartment. More particularly, the present disclosure relates to a fastening assembly for a windshield of a pressurized aircraft.

A window on an aircraft can be fixed to a fuselage of the aircraft by a plurality of bolts. The bolts, which are a kind of fastener for the window, are received in a plurality of corresponding mounting holes defined in the window. As for a pressurized compartment like a cabin of an aircraft, repeated tension loads work on the window according to repeated pressurization of the cabin of the aircraft. The tension loads can be transmitted from skin of the fuselage to the window through the fastener which fixes the window to the fuselage. As a result, an important design aspect is the mounting hole portions of the window because large fatigue load (stress) is caused around each mounting hole of the window due to the repeated pressurization of the cabin. Also, the stress around each mounting hole of the window has a significant impact on the life of the window.

In many previously known fastening assemblies for windows of pressurized aircraft, no bushing is generally used in combination with the fastener securing the window to the fuselage. However, the fasteners securing the window can relatively move minutely in the mounting hole according to the pressurization of the cabin. Such moving of the fasteners can scratch the mounting hole surface of the window and this can lead to fatigue failure of the fasteners or the window. Other known fastening assemblies use a bushing with the fastener. In one example, a rubber bushing is used with the fastener securing the window to the fuselage. However, where the rubber bushing is used, the stress to the mounting hole can still be relatively large, particularly because rubber is deformable. As a result, excessive force from the fastener can be transmitted to the mounting hole locally and may cause fatigue failure of the window.

SUMMARY

According to one aspect, a fastening assembly for a window of a pressurized fuselage of an aircraft includes a fastener received through a mounting hole defined in the window, an edge attachment member fixing the window to the fuselage, and a bushing assembly embedded in the mounting hole. The bushing assembly includes an inner sleeve bushing radially interposed between the fastener and the window and an outer sleeve bushing radially interposed between the inner sleeve bushing and the window. The inner sleeve bushing is formed from relatively less rigid metal compared with metal of the fastener and the outer sleeve bushing is formed from relatively rigid metal compared with material of the window.

According to another aspect, a fastening assembly for a window of a pressurized compartment includes a fastener received through a mounting hole defined in the window, an edge attachment member fixing the window to the compartment, and a bushing assembly embedded in the mounting hole. The bushing assembly includes an inner sleeve bushing radially interposed between the fastener and the window and an outer sleeve bushing radially interposed between the inner sleeve bushing and the window. The inner sleeve bushing is formed from relatively less rigid material compared with material of the fastener and the outer sleeve bushing is formed from relatively rigid material compared with material of the window.

BRIEF DESCRIPTION OF THE DRAWINGS

FIG. 4 is a table showing various combinations of materials for the inner and outer sleeve bushings and showing examples of the values of maximum principal stress caused in the aircraft window for each combination.

DETAILED DESCRIPTION

Figure 1:
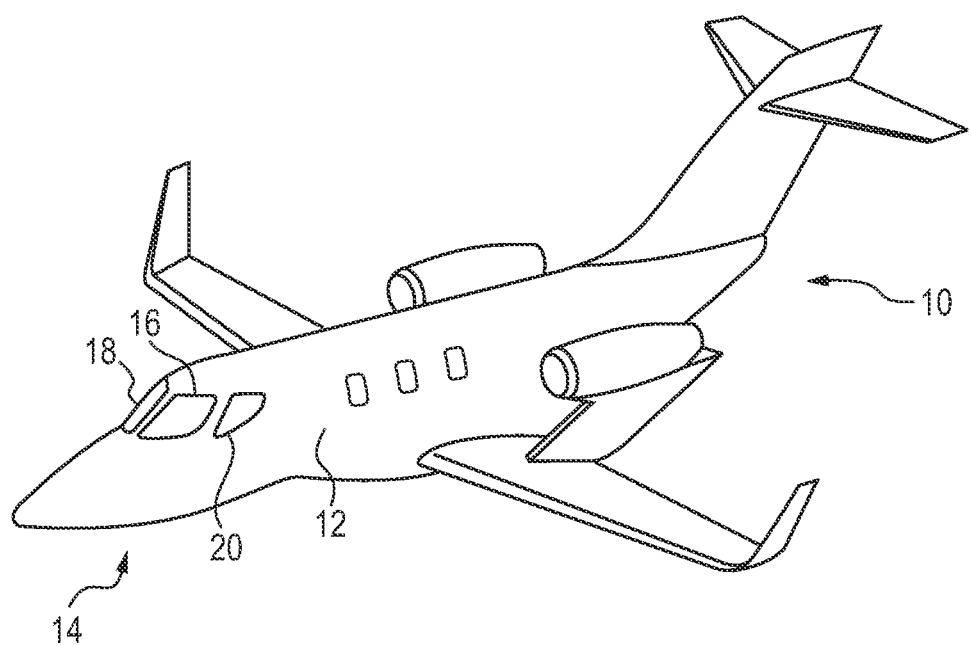
FIG. 1 is a diagrammatic perspective view of an aircraft shown with an aircraft window mounted to a fuselage of the aircraft.

Referring now to the drawings wherein the showings are only for purposes of illustrating one or more exemplary embodiments and not for purposes of limiting same, FIG. 1 illustrates an aircraft 10 having a fuselage 12 with a cockpit area 14 defined in a forward portion of the fuselage 12. An aircraft window 16, which can be a windshield of the aircraft 10, is mounted to the fuselage 12 of the aircraft 10. The aircraft window 16 is mounted adjacent another aircraft window 18, which can also be a windshield of the aircraft 10 and can be a mirrored version of the window 16. Additional windows (only aircraft window 20 shown) can be mounted immediately rearward of the windows 16, 18, respectively. As will be described in more detail below, each aircraft window can be mounted to the fuselage 12 by a plurality of fastening assemblies. Of course, it should be appreciated by those skilled in the art that other arrangements and numbers of windows can be provided on the aircraft 10.

Figure 2:
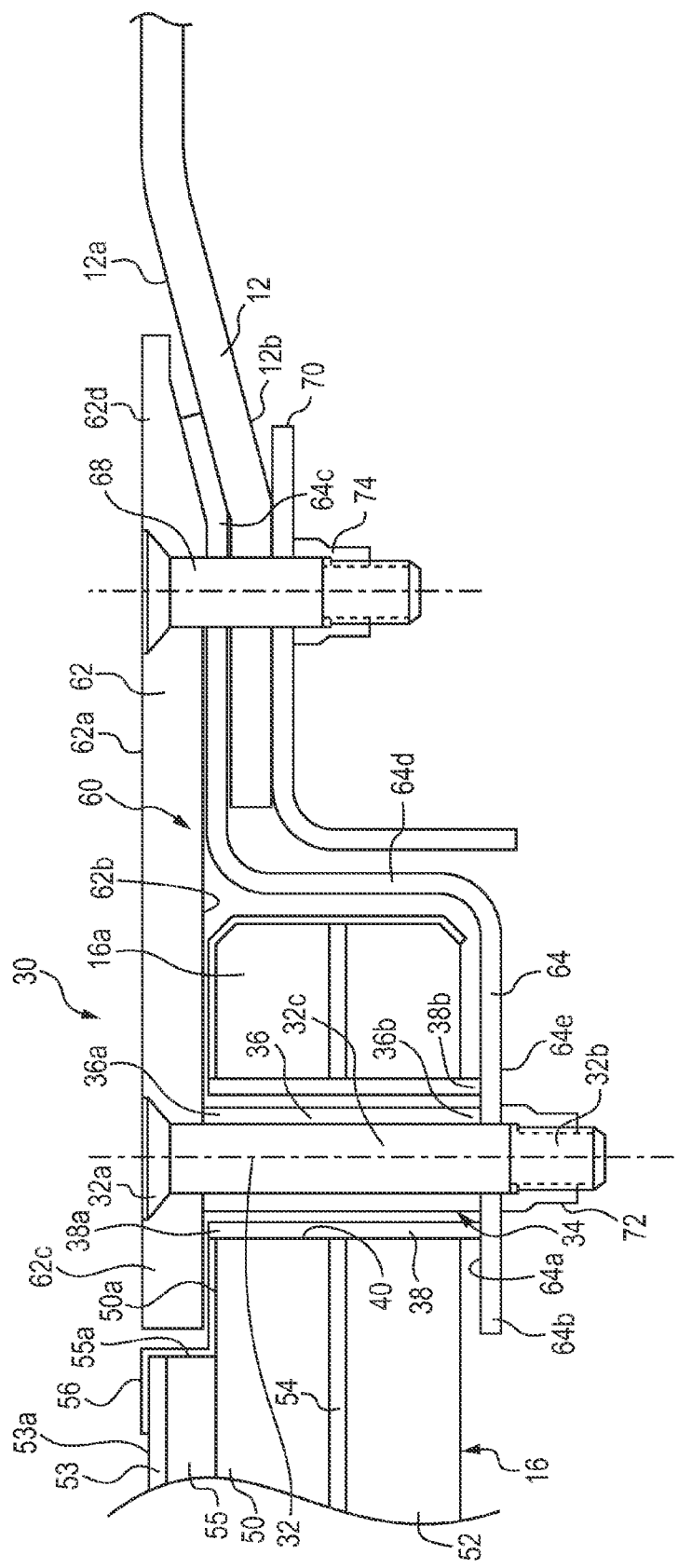
FIG. 2 is a cross-sectional view showing a first embodiment of the invention.

FIG. 2 is a cross-sectional view showing a fastening assembly 30 according to a first exemplary embodiment having a fastener 32 and a bushing assembly 34 securing the window 16 to the fuselage 12. The bushing assembly 34, which includes an inner sleeve bushing 36 and an outer sleeve bushing 38, is embedded in a mounting hole 40 defined in the window 16. More particularly, the fastener 32 is received through the mounting hole 40 defined in the window 16. The inner sleeve bushing 36 is received in the mounting hole 40 of the window 16 and is radially interposed between the fastener 32 and the outer sleeve bushing 38. The outer sleeve bushing 38 is received in the mounting hole 40 and is radially interposed between the inner sleeve bushing 36 and the window 16.

As will also be described in further detail below, the outer sleeve bushing 38 can be formed from relatively rigid material compared with material of the window 16. The outer sleeve bushing 38 can be further formed from relatively rigid material compared with material of the inner sleeve bushing 36. The inner sleeve bushing 36 can be formed from relatively less rigid material compared with material of the fastener 32. The inner sleeve bushing can further be formed from relatively less rigid material compared with material of the outer sleeve bushing 38. More particularly, in one embodiment, the outer sleeve bushing 38 is formed from relatively rigid metal compared with material of the window 16 and can be further formed from relatively rigid metal compared with metal of the inner sleeve bushing 36. Also, in one embodiment, the inner sleeve bushing 36 is formed from relatively less rigid metal compared with metal of the fastener 32 and can be further formed from relatively less rigid material compared with material of the outer sleeve bushing 38. For example, the inner sleeve bushing 36 is formed from aluminum and is used in combination with the outer sleeve bushing 38 being formed from steel. Advantageously, this combination of materials for the bushing assembly 34 has been found to significantly extend the expected life of the aircraft window 16.

The fastening assembly 30 additionally includes an edge attachment member 60 for attaching to an edge 16a of the window 16 and mounting to the fuselage 12 of the aircraft 10. As shown, the edge attachment member 60 has a cap strip 62 overlaying an outer pane 50 of the window 16 and a retainer 64 overlaying an inner pane 52 of the window 16. As also shown, the fastener 32 can extend through the cap strip 62 and through the retainer 64, but the inner and outer sleeve bushings 36, 38 can terminate at the cap strip 62 and the retainer 64.

As mentioned, the window 16 includes a structural outer pane 50 and a structural inner pane 52 adhered by an interlayer 54. The window 16 also includes a face pane 53 adhered by an interlayer 55. A thin rubber seal 56 covers surfaces 50a, 55a and 53a, respectively, of the outer pane 50, the interlayer 55 and the face pane 53 around the mounting hole 40 to protect these from damage. The surface 53a of the face pane 53 and an outer surface 62a of the cap strip 62 are on the almost same level. In one specific embodiment, the outer pane 50, the inner pane 52 and the face pane 53 are formed of stretched acrylic and the interlayers 54, 55 are formed of polyurethane though this is not required and other window materials can be used. For example, the outer, inner and face panes 50, 52 and 53 can be formed from polycarbonate. Thus, the aircraft window 16 would be a layered window formed of a stretched acrylic outer pane 50, a stretched acrylic inner pane 52, a stretched acrylic face pane 53 and polyurethane interlayers 54, 55 interposed among the panes 50, 52, 53. However, plural panes and interlayers for the windows are not required for this present invention. Also, it is to be appreciated that windows other than the aircraft window 16 shown in the illustrated embodiment could be used.

The inner sleeve bushing 36 has a first end 36a and a second end 36b. The outer sleeve bushing has a first end 38a and a second end 38b. Dimensionally, the length of the inner sleeve bushing 36 matches the distance between inner surface 62b of the cap strip 62 and the inner surface 64a of the retainer 64 of the edge attachment member 60 at the location of the mounting hole 40. The inner sleeve bushing 36 has an inner diameter matching a diameter of shank 32c of the fastener 32. The outer sleeve bushing 38 has an axial length that is same as or a just a little longer than a thickness of the aircraft window 16 at the location where the mounting hole 40 is provided. The axial length of the outer sleeve bushing 38 is a little bit shorter than the axial length of the inner sleeve bushing 36. The outer sleeve bushing 38 has an outer diameter matching an inner diameter of the mounting hole 40. The inner diameter of the outer sleeve bushing 38 is slightly larger than the outer diameter of the inner sleeve bushing 36. That is, there is a minute clearance gap between the outer sleeve bushing 38 and the inner sleeve bushing 36. Moreover, the there is a minute clearance gap between the edge 16a of the window 16 and a middle portion 64d of the retainer 64. Therefore, the window 16 can move minutely around the mounting hole 40 relative to the edge attachment assembly 60 according to the pressurization of the cabin.

The fastener 32 is a bolt having a head 32a, a threaded portion 32b and the shank 32c. The cap strip 62 has a fastening portion 62c and a fastening portion 62d. The retainer 64 has fastening portions 64b, 64c and the middle portion 64d. The middle portion 64d is the intermediate portion between the fastening portion 64b and the fastening portion 62c. The fuselage 12 has a surface portion 12a and an overlap portion 12b. The edge 16a of the window 16, the inner sleeve bushing 36 and the outer sleeve bushing 38 are sandwiched between the fastening portion 62c and the fastening portion 64b. The head 32a is received against the fastening portion 62c to limit axial movement or further insertion and the threaded portion 32b is exposed on an outer surface 64e of the fastening portion 64b. A nut 72 can be received on the threaded portion 32b for securing the edge attachment member 60 to the window 16. The axial length of the inner sleeve bushing 36 is slightly longer than the thickness of the edge 16a of the window 16.

A fastener 68 and a nut 74 are used to fix the cap strip 62 and the retainer 64 to the fuselage 12. The fastening portion 62d of the cap strip 62, the fastening portion 64c of the retainer 64, the frame 70 and the overlap portion 12b of the fuselage 12 are overlapped with each other at the fastening portion 62b and fastened by the fastener 68, which can also be a bolt. The nut 74, like the nut 72, can be used to secure the fastener 68 in the same or similar manner as described in regard to the nut 72. Thus, the cap strip 62 and the retainer 64 comprise the edge attachment member 60; and the fastener 32, the bushing assembly 34 and the edge attachment member 60 comprise the fastening assembly 30. In this embodiment, the fuselage 12 and the window 16 are fixed indirectly to each other by use of the edge attachment member 60.

As relates to the inner and outer sleeve bushings 36, 38, various types of materials could be used. However, it has been found that a bushing assembly 34 wherein the inner sleeve bushing 36 is formed of aluminum and the outer sleeve bushing 38 is formed of steel increases the expected life of the window 16 and provides additional benefits. In particular, having the outer sleeve bushing 38 formed of steel has the effect of preventing damage and de-concentrating stress in the window 16 because steel is hard to be deformed. In addition, stress concentration to the surface of the mounting hole 40 is diminished because bearing area to which the transmitted load from the fastener 32 becomes larger with use of the outer sleeve bushing 38. In contrast, having the inner sleeve bushing 36 formed of aluminum keeps the space between the cap strip 62 and the retainer 64 by clamping with the fastener 32. The inner sleeve bushing 36 protects the fastener 32 from damage like scratches. Because the inner sleeve bushing 36 is clamped by the fastener 32, any relative movement of the inner sleeve bushing 36 from the fastener 32 is minimized. In general, the material of the fastener 32 can be titanium or steel. As aluminum, which is the material of the inner sleeve bushing 36, is softer than titanium or steel, the inner sleeve bushing 36 further prevents the fastener 32 to be damaged like scratches from a standpoint of rigidity of the material. Furthermore, at least one of the bushings formed of aluminum provides an advantage of reduced weight of the fastening assembly 30.

In an aircraft application, when the cabin (chamber) is pressurized, the repeated tension loads can be transmitted from the fuselage 12 to the aircraft window 16. The above-mentioned structure of the fastening assembly 30 enables the window 16 to move smoothly even if the tension load is transmitted to the window 16. This structure reduces maximum stress around the mounting hole 40 because a plurality of members of the fastening assemblies 30 can be moved minutely according to the pressurization, and these members redistribute the transmitted loads to relieve the stress concentration around the mounting hole 40. Accordingly, this structure, which has the inner sleeve bushing 36 and the outer sleeve bushing 38, can extend the life of the window 16. The windows 18 and 20 can have a similar structure to the window 16.

Figure 3A:
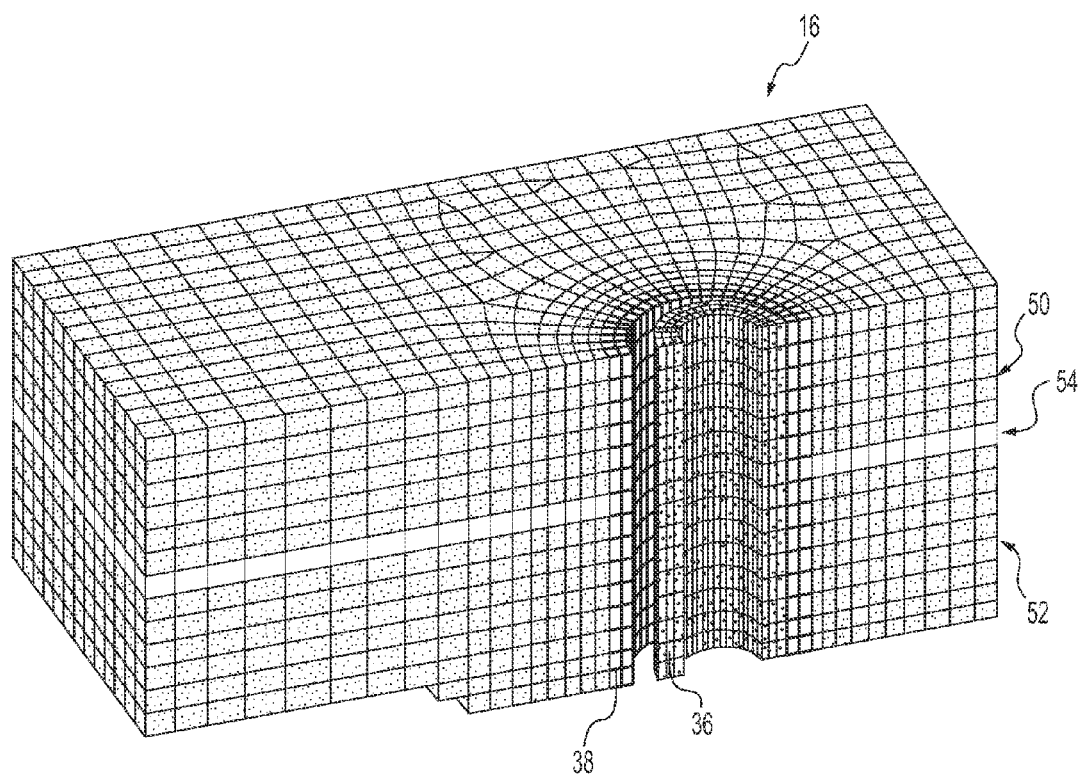
FIG. 3A and FIG. 3B show FEA (Finite Element Analysis) models of inner and outer sleeve bushings of the first embodiment mounted in the aircraft window.
Figure 3B:
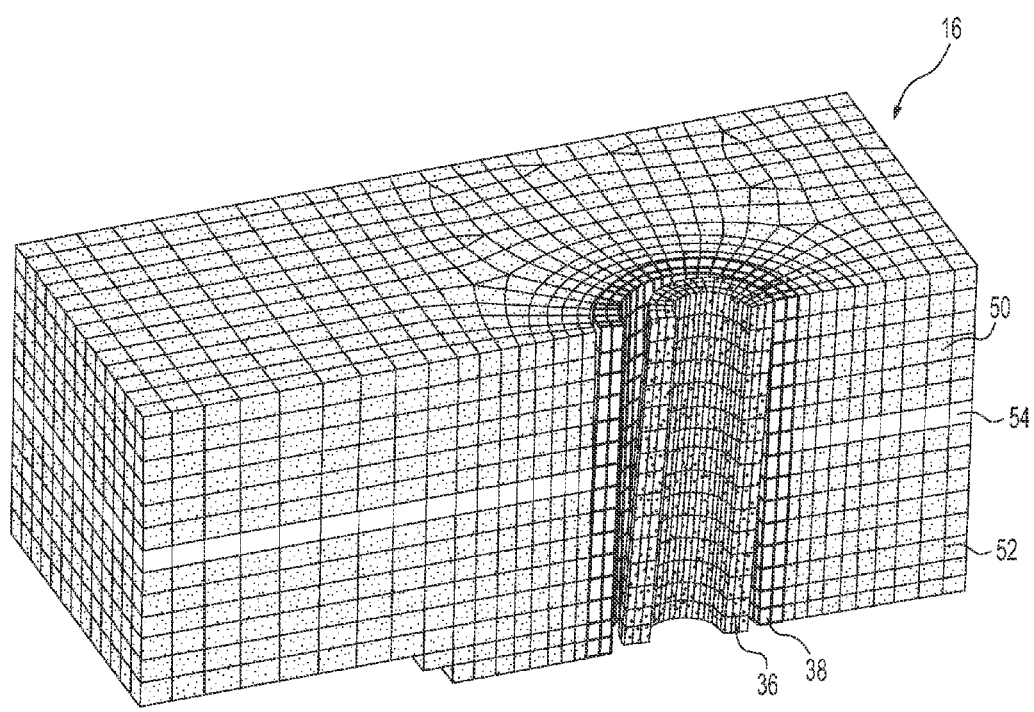

FIG. 3A and FIG. 3B show FEA (Finite Element Analysis) models of the inner and outer sleeve bushings 36, 38 and the mounting hole 40. More specifically, FIG. 3A shows the normal state and FIG. 3B shows the stressed state. This FEA model was used to check the variation of the inner and outer sleeve bushings 36, 38 and to obtain the value of the maximum principal stresses at the edge 16a of the window 16. As shown in FIG. 3B, the minute gap between the inner sleeve bushing 36 and the outer sleeve bushing 38 enables movement in a rational manner according to the magnitude and the direction of the load to be transmitted from the fuselage 12.

FIG. 4 is a table showing various combinations of materials for the inner and outer sleeve bushings 36, 38 and showing examples of maximum principal stresses caused in the window 16 for each combination. As shown in FIG. 4, if both sleeve bushings 36, 38 were formed of steel (combination A), the maximum principal stress to the window 16 would be 9.53 ksi. If the outer sleeve bushing 38 were formed of steel and the inner sleeve bushing 36 were formed of aluminum (combination B), the maximum principal stress to the window 16 would be 9.56 ksi. If the outer sleeve bushing 38 were formed of aluminum and the inner sleeve bushing 36 were formed of steel (combination C), the maximum principal stress to window 16 would be 10.18 ksi. If both sleeve bushings 36, 38 were formed of aluminum (combination D), the maximum principal stress to the window 16 would be 10.64 ksi. Accordingly, using the combination A or using the combination B results in a significantly lower level of maximum principal stress caused at the edge 16a of the window 16. Comparing the combination A and B, there is only 0.3% difference of the value of the maximum principal stress. On the other hand, weight of the aluminum inner sleeve bushing 36 is about 66% lighter than the steel inner sleeve bushing 36. In addition, the aluminum inner sleeve bushing 36 is easy to prevent the fastener 32 to be damaged from a standpoint of rigidity (ductility) of the material. Thus, the aluminum inner sleeve bushing 36 and the steel outer sleeve bushing 38 are selected for the embodiment.

Figure 5:
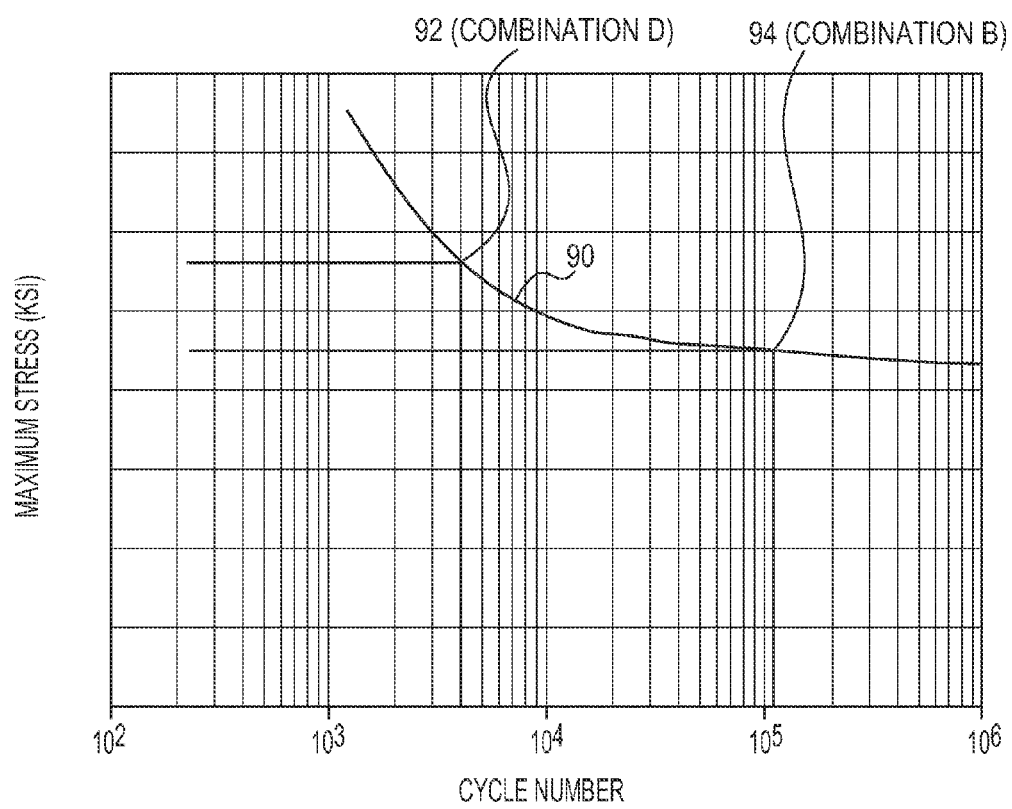
FIG. 5 is a graph showing a relationship between cycle number to fatigue failure and maximum stress for stretched acrylic which comprises the aircraft window of the first embodiment.

To illustrate the effects of maximum stress on the fatigue life of the window 16, FIG. 5 shows an S-N (maximum cyclic stress vs. cycle number to failure) curve of stretched acrylic material, that composes the window 16. As curve 90 shows in the FIG. 5, less maximum stress leads to longer life of the window 16. As shown at 92, a bushing assembly formed of an inner sleeve bushing of aluminum and an outer sleeve bushing of aluminum (combination D) would result in fatigue failure of the window 16 occurring around or after about 4,000 cycles. As shown at 94, however, the bushing assembly 34 formed of an inner sleeve bushing of aluminum and an outer sleeve bushing of steel (combination B) would result in fatigue failure of the window 16 occurring around or after over 110,000 cycles. Thus, the bushing assembly 34 with a steel outer sleeve bushing 38 and an aluminum inner sleeve bushing 36 significantly extends the life expectancy of the window 16, at least as compared to a bushing assembly where the sleeve bushings are both of aluminum. Based only on this, one skilled in the art might choose steel for both the inner and outer sleeve bushings 36, 38. However, for the reasons already discussed herein, it has been found that a combination of steel for the outer sleeve bushing 38 and aluminum for the inner sleeve bushing 36 provides significant advantages for the fastening assembly 30.

In this embodiment, the fastener 32 is formed of titanium or steel, the inner sleeve bushing 36 is formed of aluminum, the outer sleeve bushing 38 is formed of steel and the window 16 is mainly formed of acrylic. But, materials of these components are not limited to this embodiment. For example, the inner and outer sleeve bushings 36, 38 can be formed from plastic or ceramic. Materials of these components would be adopted appropriately according to severity of loads to be added to the fastening assembly area, forms of the components or other requirements and the like. However, material of the inner sleeve bushing 36 is preferably softer than the material of the outer sleeve bushing 38 and the fastener 32. Material of the outer sleeve bushing 38 should be harder than the material of the outer pane 50 and the inner pane 52 of the aircraft window 16.

Figure 6:
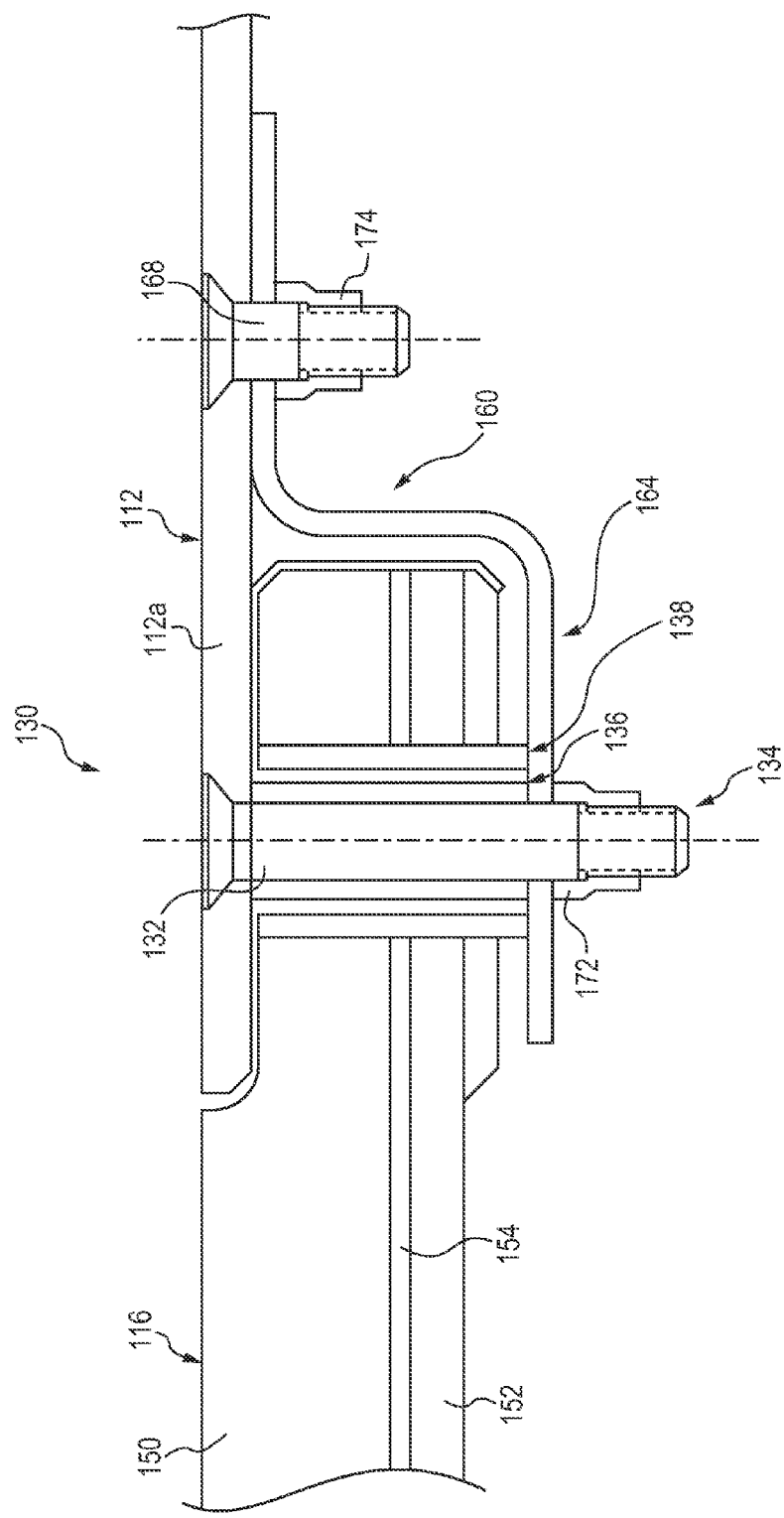
FIG. 6 is a cross-sectional view showing a second embodiment of the invention.

FIG. 6 is a cross-sectional view showing a fastening assembly 130 according to a second exemplary embodiment having an inner sleeve bushing 136 and an outer sleeve bushing 138 for securing a window 116 to a fuselage 112. Except as indicated herein, the fastening assembly 130 can be the same or similar to the fastening assembly 30 described above. Like the fastening assembly 30, in the fastening assembly 130 shown in FIG. 6, the inner sleeve bushing 136 and the outer sleeve bushing 138 comprise a bushing assembly 134; and a retainer 164 and the fuselage 112, particularly fastening portion 112a of the fuselage 112, comprise an edge attachment member 160. The window 116 in FIG. 6 includes an outer pane 150, an inner pane 152 and an interlayer 154, which can be the same or similar to the panes 50, 52 and interlayer 54 described hereinabove. In addition, a fastener 132 of the fastening assembly 130, the bushing assembly 134 and the edge attachment member 160 comprise the fastening assembly 130. A nut 172 can be used in association with the fastener 132 and a nut 174 can be used in association with a fastener 168. The fastener 132, the fastener 168, the nut 172 and the nut 174 can secure the retainer 164 to the fuselage 112. The inner and outer sleeve bushings 136, 138 can be the same or similar to the inner and outer sleeve bushings 36, 38 described above. Likewise, the retainer 164 can be the same or similar to the retainer 64 described above. In this second embodiment, the fuselage 112 and the window 116 are fixed directly to each other by use of the edge attachment member 160 including the fastening portion 112a of the fuselage 112. The fastening portion 112a, which is skin of the fuselage 112, functions as the cap strip in this second embodiment.

In either embodiment, the nuts 72, 74, 172 and/or 174 may be embedded in the respective retainers 64, 164 and/or the frame 70. Also, the fastener 32, 68, 132 and 168 need not be limited to bolts. For example, another fastening method may be used for this invention like a pin, a screw or a rivet. As will be appreciated by those skilled in the art, the subject invention need not include all the element illustrated and/or described. For example, the frame 70 need not be included. Further, alternative elements are easily applicable for these elements for a person skilled in this art.

The present invention is able to apply for not only windshield of a pressurized cockpit area of an aircraft but also a cabin window of a pressurized aircraft if the fastening assembly includes at least the fastener, the bushing assembly and the edge attachment member. The windshield may be fixed to the fuselage directly (the second embodiment of FIG. 6) or indirectly (the first embodiment of FIG. 2) through the edge attachment member either. The present invention is also applicable for other structural objects which have pressurized chamber or compartment, window with mounting hole and fastening assembly, such as space vehicles, submersible, experimental apparatus or sensing device and the like.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A fastening assembly for a window of a pressurized fuselage of an aircraft, comprising:
   a fastener received through a mounting hole defined in the window;
   an edge attachment member fixing the window to the fuselage; and
   a bushing assembly embedded in the mounting hole, wherein the bushing assembly includes an inner sleeve bushing radially interposed between the fastener and the window and an outer sleeve bushing radially interposed between the inner sleeve bushing and the window, and the inner sleeve bushing is formed from relatively less rigid metal compared with metal of the fastener and the outer sleeve bushing is formed from relatively rigid metal compared with material of the window.

2. The fastening assembly of claim 1 wherein the outer sleeve bushing is further formed from relatively rigid metal compared with a metal of the inner sleeve bushing.

3. The fastening assembly of claim 1 wherein the inner sleeve bushing has an inner diameter matching a diameter of a shank of the fastener, and the outer sleeve bushing has an outer diameter matching an inner diameter of the mounting hole.

4. The fastening assembly of claim 3 wherein the inner sleeve bushing has an axial length matching a distance between two edges of the edge attachment member, the outer sleeve bushing has an axial length which is shorter than the axial length of the inner sleeve bushing, the thickness of the window around the mounting hole is shorter than the axial length of the inner sleeve bushing, a clearance gap is defined between the inner sleeve bushing and the outer sleeve bushing, and clearance gaps are defined between the window and the inner surfaces of the edge attachment member.

5. The fastening assembly of claim 1 wherein the edge attachment member includes a cap strip and a retainer.

6. The fastening assembly of claim 1 wherein the edge attachment member includes an edge portion of the fuselage and a retainer.

7. The fastening assembly of claim 2 wherein the metal of the outer sleeve bushing is steel and the metal of the inner sleeve bushing is aluminum.

8. A fastening assembly for a window of a pressurized compartment, comprising:
   a fastener received through a mounting hole defined in the window;
   an edge attachment member fixing the window to the compartment; and
   a bushing assembly embedded in the mounting hole, wherein the bushing assembly includes an inner sleeve bushing radially interposed between the fastener and the window and an outer sleeve bushing radially interposed between the inner sleeve bushing and the window, and the inner sleeve bushing is formed from relatively less rigid material compared with material of the fastener and the outer sleeve bushing is formed from relatively rigid material compared with material of the window.

9. The fastening assembly of claim 8 wherein the outer sleeve bushing is further formed from relatively rigid material compared with material of the inner sleeve bushing.

10. The fastening assembly of claim 8 wherein the inner sleeve bushing has an inner diameter matching a diameter of a shank of the fastener, the outer sleeve bushing has an outer diameter matching an inner diameter of the mounting hole.

11. The fastening assembly of claim 10 wherein the inner sleeve bushing has an axial length matching a distance between two edges of the edge attachment member, the outer sleeve bushing has an axial length which is shorter than the axial length of the inner sleeve bushing, the thickness of the window around the mounting hole is shorter than the axial length of the inner sleeve bushing, a clearance gap is defined between the inner sleeve bushing and the outer sleeve bushing, and clearance gaps are defined between the window and the inner surfaces of the edge attachment member.

12. The fastening assembly of claim 8 wherein the edge attachment member includes a cap strip and a retainer.

13. The fastening assembly of claim 8 wherein the edge attachment member includes an edge portion of the compartment and a retainer.

14. The fastening assembly of claim 9 wherein the material of the outer sleeve bushing is steel and the material of the inner sleeve bushing is aluminum.

15. The fastening assembly of claim 8 wherein the pressurized compartment is a cabin of an aircraft, space vehicle, submersible, experimental apparatus or sensing device.

* * * * *